United States Patent
Sonnerat

[11] 3,921,776
[45] Nov. 25, 1975

[54] RESILIENTLY ALIGNED AND CENTERED CLUTCH RELEASE BEARING

[75] Inventor: Claude Sonnerat, Annecy, France

[73] Assignee: Societe Nouvelle de Roulements, Annecy, France

[22] Filed: Mar. 12, 1974

[21] Appl. No.: 450,517

[30] Foreign Application Priority Data
Mar. 27, 1973 France .............................. 73.11001

[52] U.S. Cl. .................................... 192/98; 308/26
[51] Int. Cl.² .................................... F16D 13/60
[58] Field of Search .......................... 192/98, 110 B

[56] References Cited
UNITED STATES PATENTS

| | | | |
|---|---|---|---|
| 3,333,664 | 8/1967 | Chapaitis | 192/98 |
| 3,625,327 | 12/1971 | Birdsey | 192/98 |
| 3,631,954 | 1/1972 | Coaley | 192/98 |
| 3,788,437 | 1/1974 | Camp | 192/98 |
| 3,805,934 | 4/1974 | Labadie | 192/98 |

Primary Examiner—Benjamin W. Wyche

[57] ABSTRACT

A clutch release bearing assembly includes an antifriction bearing supported for sliding movement on a bearing guide tube by a resilient aligning and centering sleeve. The sleeve is formed from a resilient material by injection or compression molding and includes an outer annular portion adapted to support the bearing, an inner cylindrical sleeve portion adapted to be slidably mounted on the guide tube, and a resilient web portion integrally joining the inner and outer portions. The web is deformable to permit centering and aligning movement during actuation of the clutch.

10 Claims, 5 Drawing Figures

RESILIENTLY ALIGNED AND CENTERED CLUTCH RELEASE BEARING

BACKGROUND OF THE INVENTION

1. Field of the Invention

This invention relates to clutch release bearings and more particularly to an improved clutch release ball bearing having a built-in resilient centering and aligning system.

2. Description of the Prior Art

It is known to provide a clutch release bearing in a plate clutch for a motor vehicle transmission, these prior art bearings conventionally being a rigid ball bearing with deep grooves acting as an oblique contact bearing when the clutch is disengaged. One of the two bearing races, which may be the inner race or the outer race of the clutch release of this known type, transmits the declutching force to the clutch mechanism.

If this race comes into direct contact with a declutching mechanism of the diaphragm type, it generally has a toric contact surface and the clutch release bearing is not accurately centered on the shaft. This may, for example, be due to the fact that the clutch release bearing guide tube and the clutch are generally not accurately centered in relation to one another. The clutch release bearing contact surface then slides on the diaphragm of the declutching system, so that both elements wear quickly.

Also, the declutching diaphragm is generally of poor accuracy because it is made by deep-drawing and cutting out of a metal sheet and there is often some warping at the contact with the clutch release bearing contact surface, so that the rotating element of the clutch release bearing cannot operate under optimum conditions.

The axis of the clutch and the axis of the clutch release bearing guide tube sometimes also have the fault that they are not parallel, and this introduces additional warping at the contact between the declutching diaphragm and the clutch release bearing contact surface.

Attempts have been made to overcome these disadvantages by heat or surface treatment of the diaphragm of the clutch system to reduce friction and wear. Also, friction-type self-centering systems for the clutch release bearing rotating element have been employed to align the axes of the clutch release bearing and of the clutch. While these constructions have reduced wear and prolonged the life of the clutch assemblies, they are expensive to manufacture and do not allow the problem to be completely solved.

SUMMARY OF THE INVENTION

The main object of this invention is to provide a clutch release bearing which will overcome the above objects and mechanical drawbacks of the prior art while considerably reducing the noise generally produced by clutch release bearings.

The clutch release bearing with resilient centering and alignment means according to the invention comprises a resilient centering sleeve made from a flexible material which is capable of being injection or compression molded and having an inner central part — which may or may not be reinforced — which can slide on a clutch release bearing guide tube, an outer part bearing a clutch release bearing actuating element and which locks one of the bearing races, and a thinner side wall in the form of a bellows-like construction connecting the said central inner part and the said outer part. The flexible material and the bellowsform of the sleeve allow some radial and axial displacement of the outer part of the sleeve, and this displacement allows the centering and alignment corrections of the clutch release bearing assembly mounted on the guide tube with the clutch system, by self-centering and self-alignment.

BRIEF DESCRIPTION OF THE DRAWINGS

Other advantages and features of the invention will be apparent from the following description of various embodiments of these resiliently aligned and centered clutch release bearings, which are given by way of example without limiting force and are shown in the accompanying drawing wherein.

DESCRIPTION OF THE PREFERRED EMBODIMENTS

Figure 1:
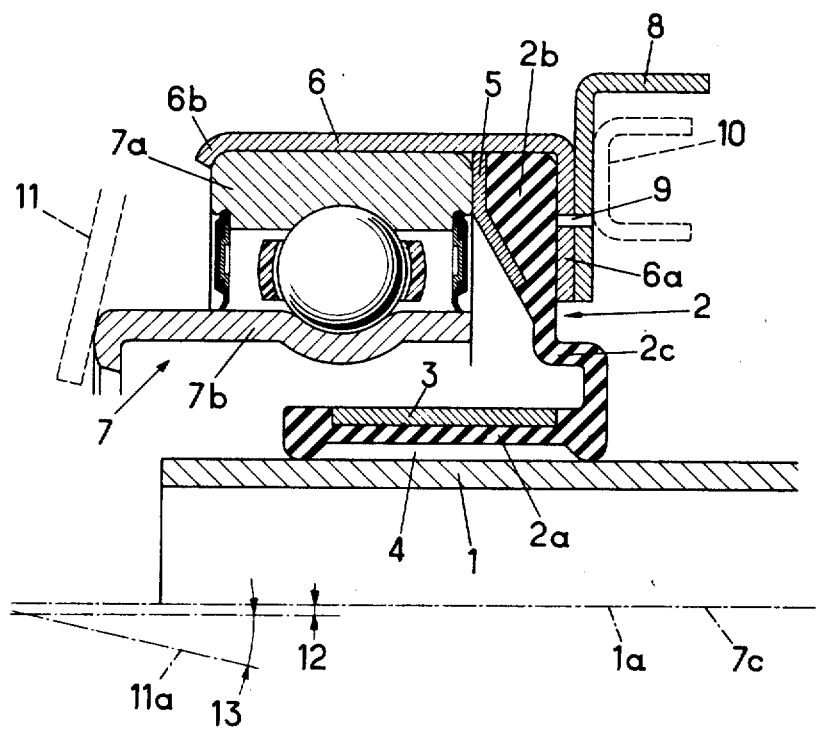
FIG. 1 is a diagram of an improved clutch release bearing according to the invention, in which the outer part of the centering sleeve is connected to the bearing by means of a casing.

Referring now to the drawings in detail, FIG. 1 shows a clutch release bearing adapted to slide axially on a clutch release bearing guide tube 1 of axis 1a which, as a result of the stacking of the components on assembly, is generally at least slightly off-center and non-parallel to the axis 11a of the clutch diaphragm 11, this eccentricity and misalignment being exaggerated in the drawings for illustrative purposes. According to the invention, the clutch release bearing is so devised that even though the two axes are in an off-center position, the clutch release bearing can operate correctly for the entire period of the clutching operation.

The bearing comprises a resilient centering sleeve 2 made from flexible material adapted to injection or compression molding. Sleeve 2 has an internal cylindrical part 2a which acts as a centering and guide bushing for the clutch release bearing. The inner cylindrical part 2a has a metal ring 3 on its outer periphery to give it additional strength while the bore has a recess 4 adapted to limit friction on the one hand and act as a lubricant reserve on the other hand.

The centering sleeve 2 also comprises an outer circular part 2b, with the inner cylindrical part 2a and the outer circular part 2b being integrally connected by a resilient web 2c which also forms part of the sleeve 2. The thin web 2c is in the form of a concertina bellows. The outer circular part 2b has a metal reinforcement 5 on one surface to give it additional strength. A cylindrical metal casing 6 has an inwardly directed annular flange or rim 6a applied to the opposite surface of the outer circular part 2b to the surface having the metal reinforcement 5. A ball bearing 7 comprises an outer race 7a and an inner race 7b. The outer race 7a is engaged and retained in the metal casing 6 in contact with the metal reinforcement 5; it is locked in the said metal casing 6 by means of its bent-over edge 6b.

An actuating element 8 is secured to the annular edge 6a of the metal casing 6 by welding 9 or any other fixing means. It is adapted to allow the fork 10 to control the axial movement of the clutch release bearing on the guide tube 1 towards the clutch diaphragm 11. On movement of the clutch release bearing, the inner race 7b of the bearing 7 axially flexes the diaphragm 11 of the clutch and thus disengages the clutch. In FIG. 1 the axis of the bearing 7c is illustrated as coinciding with the axis 1a of the guide tube. The diaphragm 11 has an axis 11a which is illustrated as off-center in relation to the axis 1a by an off-center distance 12; also, axis 11a is not parallel to axis 1a with the angular alignment gap being indicated at 13.

Figure 2:
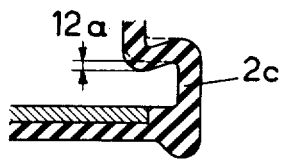
FIG. 2 shows the configuration of the resilient bellows-like part of the sleeve of FIG. 1 after centering of the bearing in relation to the diaphragm.

FIG. 2 shows the radial deformation 12a of the web 2c on automatic recentering of the axis of the bearing 7c on the axis of the diaphragm 11a. The deformation 12a is of the same value as the off-center distance 12.

Figure 3:
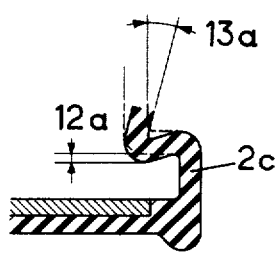
FIG. 3 shows the same resilient part of the sleeve as FIG. 2 after centering of the bearing in relation to the diaphragm and correction of the non-parallel fault of the axes of the diaphragm and the clutch release bearing.

FIG. 3 shows the axial deformation 13a of the web 2c on automatic realignment of the axis of the bearing 7c on the axis of the diaphragm 11a. The axial deformation 13a is of the same value as the angular gap 13. In the position of the bearing corresponding to deformation of the web 2c as shown in FIG. 3, the axis 7c of the bearing then coincides with the axis 11a of the diaphragm 11.

Figure 4:
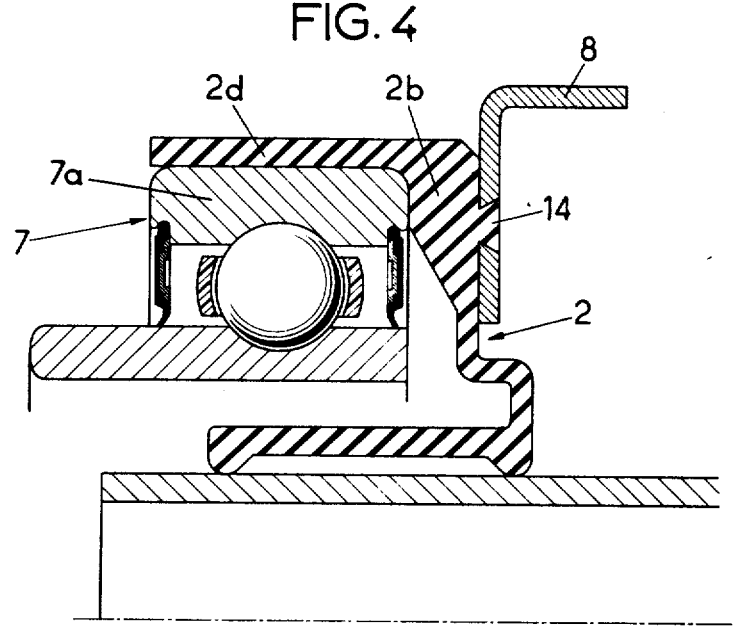
FIG. 4 is a diagram of a variant of the clutch release bearing according to FIG. 1, in which the outer part of the centering sleeve acts as a housing for the bearing.

FIG. 4 shows a variant embodiment of the clutch release bearing according to FIG. 1. In this variant, the resilient centering sleeve 2 is continued axially at its outer circular part 2b in the form of a collar 2d, in the bore of which the bearing 7 is engaged with a force-fit, the outer race 7a thus being locked.

The actuating element 8 can be secured to the centering sleeve by gluing, clips, or by molding one element on the other in suitable apertures 14.

Figure 5:
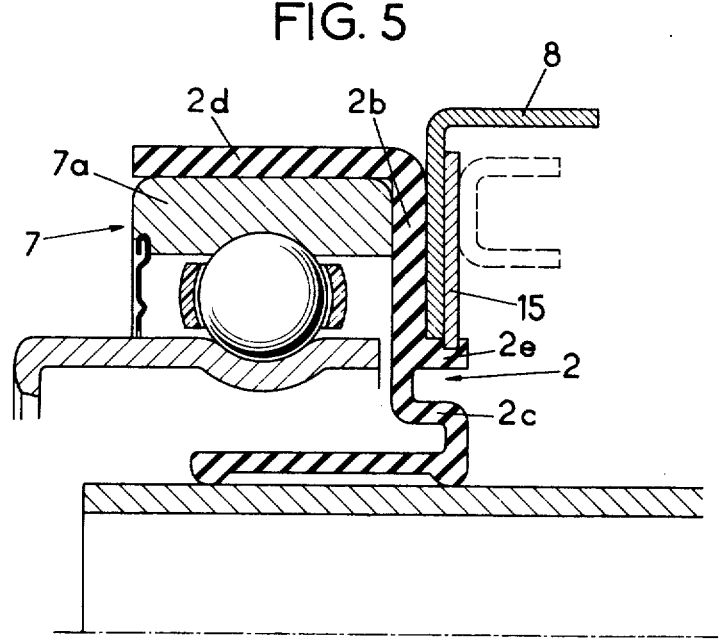
FIG. 5 is a diagram of a variant of the clutch release bearing according to FIG. 4, in which the centering sleeve allows different fixing of the clutch release bearing actuating element.

FIG. 5 shows a variant embodiment of the clutch release bearing according to FIG. 4, in which the resilient centering sleeve 2 has a longitudinally projecting circular shoulder 2e on the outer side surface above the resilient web 2c, said shoulder being formed with a groove around the entire outer periphery so that a support washer 15 can be secured thereto by clips to hold the actuating element 8 against the outer surface of the sleeve.

Of course, the above-described embodiment may undergo various modifications, improvements or additions, or some of the elements may be replaced by equivalent elements, without thereby departing from the general scope of the invention. Accordingly, while I have disclosed and described preferred embodiments of my invention, I wish it be understood that I do not intend to be restricted thereto, but rather that I intend to include all embodiments thereof which would be apparent to one skilled in the art and which come within the spirit and scope of my invention.

What is claimed is:

1. In a resiliently centered and aligned clutch release bearing assembly including an antifriction bearing having inner and outer races with rolling elements disposed therebetween and a resilient centering sleeve supporting said bearing, said sleeve being integrally formed from a flexible material adapted to be injection or compression molded, the improvement wherein said sleeve comprises radially inner and outer portions joined by a circular part in the form of a bellows deformable both axially and radially to permit both centering and aligning movement of said bearing during actuation of the clutch.

2. A clutch release bearing according to claim 1 wherein said inner portion of said resilient centering sleeve comprises an inner circular sleeve portion having an axial bore extending therethrough, said axial bore being slidably mounted on a bearing guide tube for guiding and centering the clutch release bearing on said guide tube.

3. The clutch release bearing according to claim 2 further comprising means reinforcing said circular sleeve portion.

4. The clutch release bearing according to claim 2 further comprising an annular recess formed in said axial bore of said circular sleeve portion at a location spaced from the ends thereof to facilitate its sliding on said guide tube and to form a lubricant reserve.

5. A clutch release bearing according to claim 2 further comprising a metal casing supporting and centering said outer portion of said bearing, and wherein said resilient centering sleeve comprises an outer circular part, said metal casing enclosing and supporting said outer circular part.

6. A clutch release bearing according to claim 5 further comprising means reinforcing said outer circular part.

7. A clutch release bearing according to claim 2 wherein said resilient centering sleeve further comprises an axially extending annular sleeve portion defining a housing for said bearing.

8. A clutch release bearing according to claim 2 further comprising a clutch actuating element mounted on said outer portion of said resilient centering sleeve.

9. A clutch release bearing according to claim 8 wherein said actuating element is mounted on said centering sleeve by molding said centering sleeve in interlocking contact with said actuating element.

10. A resiliently centered and aligned clutch release bearing assembly comprising an antifriction bearing having inner and outer races with rolling elements disposed therebetween and a resilient centering sleeve supporting said bearing, said sleeve being integrally formed from a flexible material adapted to be injection or compression molded and having a circular part in the form of a bellows which is deformable both axially and radially to permit centering and aligning movement of said bearing during actuation of the clutch, said centering sleeve further including an inner circular sleeve portion having an axial bore extending therethrough and slidably mounted on a bearing guide tube for guiding and centering the clutch release bearing on said guide tube and an axially extending annular shoulder having an annular groove formed in its outer periphery, an actuating element mounted on said centering sleeve, and an annular wear washer mounted in said groove and retaining said actuating element on said centering sleeve.

* * * * *